(12) United States Patent
Alfson et al.

(10) Patent No.: US 11,167,495 B2
(45) Date of Patent: Nov. 9, 2021

(54) SYSTEM AND METHOD FOR ADDITIVELY MANUFACTURING FUNCTIONAL ELEMENTS INTO EXISTING COMPONENTS

(71) Applicant: Continuous Composites Inc., Coeur d'Alene, ID (US)

(72) Inventors: Blake L. Alfson, Hayden Lake, ID (US); Ryan C Stockett, Lebanon, NH (US); Kenneth Lyle Tyler, Coeur d'Alene, ID (US)

(73) Assignee: Continuous Composites Inc., Coeur d'Alene, ID (US)

( * ) Notice: Subject to any disclaimer, the term of this patent is extended or adjusted under 35 U.S.C. 154(b) by 922 days.

(21) Appl. No.: 15/858,236

(22) Filed: Dec. 29, 2017

(65) Prior Publication Data

US 2019/0202131 A1 Jul. 4, 2019

(51) Int. Cl.
*B29C 64/165* (2017.01)
*B33Y 30/00* (2015.01)
(Continued)

(52) U.S. Cl.
CPC ........ *B29C 64/393* (2017.08); *B29C 37/0078* (2013.01); *B29C 64/165* (2017.08);
(Continued)

(58) Field of Classification Search
CPC ... B29C 64/165; B29C 64/209; B29C 64/291; B29C 64/295; B29C 64/30;
(Continued)

(56) References Cited

U.S. PATENT DOCUMENTS 3,286,305 A  11/1966 Seckel
3,809,514 A   5/1974 Nunez
(Continued)

FOREIGN PATENT DOCUMENTS

DE  4102257 A1  7/1992
EP  2589481 B1  1/2016
(Continued)

OTHER PUBLICATIONS

A. Di. Pietro & Paul Compston, Resin Hardness and Interlaminar Shear Strength of a Glass-Fibre/Vinylester Composite Cured with High Intensity Ultraviolet (UV) Light, Journal of Materials Science, vol. 44, pp. 4188-4190 (Apr. 2009).
(Continued)

*Primary Examiner* — Xiao S Zhao
*Assistant Examiner* — Joseph S Leyson
(74) *Attorney, Agent, or Firm* — Ryan C. Stockett

(57) ABSTRACT

A system is disclosed for additively manufacturing a composite structure. The system may include a head having a matrix reservoir, a nozzle fluidly connected to the matrix reservoir and configured to discharge a composite material into a feature of an existing component. a guide configured to detect a location of the feature, and a cure enhancer configured to expose composite material discharging from the nozzle to a cure energy. The system may also include a support configured to move the head in multiple dimensions, and a controller in communication with the cure enhancer and the support. The controller may be configured to cause the support to move the head during discharge of the composite material into the feature based on the detected location of the feature.

16 Claims, 6 Drawing Sheets

(51) Int. Cl.

| | |
|---|---|
| *B29C 64/209* | (2017.01) |
| *B29C 70/38* | (2006.01) |
| *B29C 70/78* | (2006.01) |
| *B29C 64/336* | (2017.01) |
| *B29C 64/295* | (2017.01) |
| *B29C 64/393* | (2017.01) |
| *B33Y 50/02* | (2015.01) |
| *B29C 70/68* | (2006.01) |
| *B29C 37/00* | (2006.01) |

(52) U.S. Cl.
CPC .......... *B29C 64/209* (2017.08); *B29C 64/295* (2017.08); *B29C 64/336* (2017.08); *B29C 70/382* (2013.01); *B29C 70/384* (2013.01); *B29C 70/682* (2013.01); *B29C 70/78* (2013.01); *B33Y 30/00* (2014.12); *B33Y 50/02* (2014.12)

(58) Field of Classification Search
CPC ... B29C 64/336; B29C 70/382; B29C 70/384; B29C 70/682; B29C 70/683; B29C 70/78; B29C 70/80; B33Y 30/00
See application file for complete search history.

(56) References Cited

U.S. PATENT DOCUMENTS

| | | | |
|---|---|---|---|
| 3,984,271 A | 10/1976 | Gilbu | |
| 3,993,726 A | 11/1976 | Moyer | |
| 4,643,940 A | 2/1987 | Shaw et al. | |
| 4,671,761 A | 6/1987 | Adrian et al. | |
| 4,822,548 A | 4/1989 | Hempel | |
| 4,851,065 A | 7/1989 | Curtz | |
| 5,002,712 A | 3/1991 | Goldmann et al. | |
| 5,037,691 A | 8/1991 | Medney et al. | |
| 5,296,335 A | 3/1994 | Thomas et al. | |
| 5,340,433 A | 8/1994 | Crump | |
| 5,746,967 A | 5/1998 | Hoy et al. | |
| 5,866,058 A | 2/1999 | Batchelder et al. | |
| 5,936,861 A | 8/1999 | Jang et al. | |
| 6,153,034 A | 11/2000 | Lipsker | |
| 6,459,069 B1 | 10/2002 | Rabinovich | |
| 6,501,554 B1 | 12/2002 | Hackney et al. | |
| 6,799,081 B1 | 9/2004 | Hale et al. | |
| 6,803,003 B2 | 10/2004 | Rigali et al. | |
| 6,934,600 B2 | 8/2005 | Jang et al. | |
| 7,039,485 B2 | 5/2006 | Engelbart et al. | |
| 7,555,404 B2 | 6/2009 | Brennan et al. | |
| 7,795,349 B2 | 9/2010 | Bredt et al. | |
| 8,221,669 B2 | 7/2012 | Batchelder et al. | |
| 8,962,717 B2 | 2/2015 | Roth et al. | |
| 9,126,365 B1 | 9/2015 | Mark et al. | |
| 9,126,367 B1 | 9/2015 | Mark et al. | |
| 9,149,988 B2 | 10/2015 | Mark et al. | |
| 9,156,205 B2 | 10/2015 | Mark et al. | |
| 9,186,846 B1 | 11/2015 | Mark et al. | |
| 9,186,848 B2 | 11/2015 | Mark et al. | |
| 9,327,452 B2 | 5/2016 | Mark et al. | |
| 9,327,453 B2 | 5/2016 | Mark et al. | |
| 9,370,896 B2 | 6/2016 | Mark | |
| 9,381,702 B2 | 7/2016 | Hollander | |
| 9,457,521 B2 | 10/2016 | Johnston et al. | |
| 9,458,955 B2 | 10/2016 | Hammer et al. | |
| 9,527,248 B2 | 12/2016 | Hollander | |
| 9,539,762 B2 | 1/2017 | Durand et al. | |
| 9,579,851 B2 | 2/2017 | Mark et al. | |
| 9,688,028 B2 | 6/2017 | Mark et al. | |
| 9,694,544 B2 | 7/2017 | Mark et al. | |
| 9,764,378 B2 | 9/2017 | Peters et al. | |
| 9,770,876 B2 | 9/2017 | Farmer et al. | |
| 9,782,926 B2 | 10/2017 | Witzel et al. | |
| 10,919,222 B2 * | 2/2021 | Alfson | B29C 64/30 |
| 2002/0009935 A1 | 1/2002 | Hsiao et al. | |
| 2002/0062909 A1 | 5/2002 | Jang et al. | |
| 2002/0113331 A1 | 8/2002 | Zhang et al. | |
| 2002/0165304 A1 | 11/2002 | Mulligan et al. | |
| 2003/0044539 A1 | 3/2003 | Oswald | |
| 2003/0056870 A1 | 3/2003 | Comb et al. | |
| 2003/0160970 A1 | 8/2003 | Basu et al. | |
| 2003/0186042 A1 | 10/2003 | Dunlap et al. | |
| 2003/0236588 A1 | 12/2003 | Jang et al. | |
| 2005/0006803 A1 | 1/2005 | Owens | |
| 2005/0061422 A1 | 3/2005 | Martin | |
| 2005/0104257 A1 | 5/2005 | Gu et al. | |
| 2005/0109451 A1 | 5/2005 | Hauber et al. | |
| 2005/0230029 A1 | 10/2005 | Vaidyanathan et al. | |
| 2007/0003650 A1 | 1/2007 | Schroeder | |
| 2007/0228592 A1 | 10/2007 | Dunn et al. | |
| 2008/0176092 A1 | 7/2008 | Owens | |
| 2009/0095410 A1 | 4/2009 | Oldani | |
| 2011/0032301 A1 | 2/2011 | Fienup et al. | |
| 2011/0143108 A1 | 6/2011 | Fruth et al. | |
| 2012/0060468 A1 | 3/2012 | Dushku et al. | |
| 2012/0159785 A1 | 6/2012 | Pyles et al. | |
| 2012/0231225 A1 | 9/2012 | Mikulak et al. | |
| 2012/0247655 A1 | 10/2012 | Erb et al. | |
| 2013/0164498 A1 | 6/2013 | Langone et al. | |
| 2013/0209600 A1 | 8/2013 | Tow | |
| 2013/0233471 A1 | 9/2013 | Kappesser et al. | |
| 2013/0292039 A1 | 11/2013 | Peters et al. | |
| 2013/0337256 A1 | 12/2013 | Farmer et al. | |
| 2013/0337265 A1 | 12/2013 | Farmer | |
| 2014/0034214 A1 | 2/2014 | Boyer et al. | |
| 2014/0061974 A1 | 3/2014 | Tyler | |
| 2014/0159284 A1 | 6/2014 | Leavitt | |
| 2014/0232035 A1 | 8/2014 | Bheda | |
| 2014/0268604 A1 | 9/2014 | Wicker et al. | |
| 2014/0291886 A1 | 10/2014 | Mark et al. | |
| 2015/0136455 A1 | 5/2015 | Fleming | |
| 2015/0174824 A1 * | 6/2015 | Gifford | B29C 64/182 425/183 |
| 2015/0367576 A1 * | 12/2015 | Page | B29C 64/112 264/257 |
| 2016/0012935 A1 | 1/2016 | Rothfuss | |
| 2016/0031155 A1 | 2/2016 | Tyler | |
| 2016/0046082 A1 | 2/2016 | Fuerstenberg | |
| 2016/0052208 A1 | 2/2016 | Debora et al. | |
| 2016/0082641 A1 | 3/2016 | Bogucki et al. | |
| 2016/0082659 A1 | 3/2016 | Hickman et al. | |
| 2016/0107379 A1 | 4/2016 | Mark et al. | |
| 2016/0114532 A1 | 4/2016 | Schirtzinger et al. | |
| 2016/0136885 A1 | 5/2016 | Nielsen-Cole et al. | |
| 2016/0144565 A1 | 5/2016 | Mark et al. | |
| 2016/0144566 A1 | 5/2016 | Mark et al. | |
| 2016/0192741 A1 | 7/2016 | Mark | |
| 2016/0200047 A1 | 7/2016 | Mark et al. | |
| 2016/0243762 A1 | 8/2016 | Fleming et al. | |
| 2016/0263806 A1 | 9/2016 | Gardiner | |
| 2016/0263822 A1 | 9/2016 | Boyd | |
| 2016/0263823 A1 | 9/2016 | Espiau et al. | |
| 2016/0271876 A1 | 9/2016 | Lower | |
| 2016/0297104 A1 | 10/2016 | Guillemette et al. | |
| 2016/0311165 A1 | 10/2016 | Mark et al. | |
| 2016/0325491 A1 | 11/2016 | Sweeney et al. | |
| 2016/0332369 A1 | 11/2016 | Shah et al. | |
| 2016/0339633 A1 | 11/2016 | Stolyarov et al. | |
| 2016/0346998 A1 | 12/2016 | Mark et al. | |
| 2016/0361869 A1 | 12/2016 | Mark et al. | |
| 2016/0368213 A1 | 12/2016 | Mark | |
| 2016/0368255 A1 | 12/2016 | Witte et al. | |
| 2017/0007359 A1 | 1/2017 | Kopelman et al. | |
| 2017/0007360 A1 | 1/2017 | Kopelman et al. | |
| 2017/0007361 A1 | 1/2017 | Boronkay et al. | |
| 2017/0007362 A1 | 1/2017 | Chen et al. | |
| 2017/0007363 A1 | 1/2017 | Boronkay | |
| 2017/0007365 A1 | 1/2017 | Kopelman et al. | |
| 2017/0007366 A1 | 1/2017 | Kopelman et al. | |
| 2017/0007367 A1 | 1/2017 | Li et al. | |
| 2017/0007368 A1 | 1/2017 | Boronkay | |
| 2017/0007386 A1 | 1/2017 | Mason et al. | |
| 2017/0008333 A1 | 1/2017 | Mason et al. | |
| 2017/0015059 A1 | 1/2017 | Lewicki | |
| 2017/0015060 A1 | 1/2017 | Lewicki et al. | |

(56) References Cited

U.S. PATENT DOCUMENTS

| | | |
|---|---|---|
| 2017/0021565 A1 | 1/2017 | Deaville |
| 2017/0028434 A1 | 2/2017 | Evans et al. |
| 2017/0028588 A1 | 2/2017 | Evans et al. |
| 2017/0028617 A1 | 2/2017 | Evans et al. |
| 2017/0028619 A1 | 2/2017 | Evans et al. |
| 2017/0028620 A1 | 2/2017 | Evans et al. |
| 2017/0028621 A1 | 2/2017 | Evans et al. |
| 2017/0028623 A1 | 2/2017 | Evans et al. |
| 2017/0028624 A1 | 2/2017 | Evans et al. |
| 2017/0028625 A1 | 2/2017 | Evans et al. |
| 2017/0028627 A1 | 2/2017 | Evans et al. |
| 2017/0028628 A1 | 2/2017 | Evans et al. |
| 2017/0028633 A1 | 2/2017 | Evans et al. |
| 2017/0028634 A1 | 2/2017 | Evans et al. |
| 2017/0028635 A1 | 2/2017 | Evans et al. |
| 2017/0028636 A1 | 2/2017 | Evans et al. |
| 2017/0028637 A1 | 2/2017 | Evans et al. |
| 2017/0028638 A1 | 2/2017 | Evans et al. |
| 2017/0028639 A1 | 2/2017 | Evans et al. |
| 2017/0028644 A1 | 2/2017 | Evans et al. |
| 2017/0030207 A1 | 2/2017 | Kittleson |
| 2017/0036403 A1 | 2/2017 | Ruff et al. |
| 2017/0050340 A1 | 2/2017 | Hollander |
| 2017/0057164 A1 | 3/2017 | Hemphill et al. |
| 2017/0057165 A1 | 3/2017 | Waldrop et al. |
| 2017/0057167 A1 | 3/2017 | Tooren et al. |
| 2017/0057181 A1 | 3/2017 | Waldrop et al. |
| 2017/0064840 A1 | 3/2017 | Espalin et al. |
| 2017/0066187 A1 | 3/2017 | Mark et al. |
| 2017/0087768 A1 | 3/2017 | Bheda |
| 2017/0106565 A1 | 4/2017 | Braley et al. |
| 2017/0120519 A1 | 5/2017 | Mark |
| 2017/0129170 A1 | 5/2017 | Kim et al. |
| 2017/0129171 A1 | 5/2017 | Gardner et al. |
| 2017/0129176 A1 | 5/2017 | Waatti et al. |
| 2017/0129182 A1 | 5/2017 | Sauti et al. |
| 2017/0129186 A1 | 5/2017 | Sauti et al. |
| 2017/0144375 A1 | 5/2017 | Waldrop et al. |
| 2017/0151728 A1 | 6/2017 | Kunc et al. |
| 2017/0157828 A1 | 6/2017 | Mandel et al. |
| 2017/0157831 A1 | 6/2017 | Mandel et al. |
| 2017/0157844 A1 | 6/2017 | Mandel et al. |
| 2017/0157851 A1 | 6/2017 | Nardiello et al. |
| 2017/0165908 A1 | 6/2017 | Pattinson et al. |
| 2017/0173868 A1 | 6/2017 | Mark |
| 2017/0182712 A1 | 6/2017 | Scribner et al. |
| 2017/0210074 A1 | 7/2017 | Ueda et al. |
| 2017/0217088 A1 | 8/2017 | Boyd et al. |
| 2017/0232674 A1 | 8/2017 | Mark |
| 2017/0259502 A1 | 9/2017 | Chapiro et al. |
| 2017/0259507 A1 | 9/2017 | Hocker |
| 2017/0266876 A1 | 9/2017 | Hocker |
| 2017/0274585 A1 | 9/2017 | Armijo et al. |
| 2017/0284876 A1 | 10/2017 | Moorlag et al. |

FOREIGN PATENT DOCUMENTS

| | | |
|---|---|---|
| EP | 3219474 A1 | 9/2017 |
| KR | 100995983 B1 | 11/2010 |
| KR | 101172859 B1 | 8/2012 |
| WO | 2013017284 A2 | 2/2013 |
| WO | 2016088042 A1 | 6/2016 |
| WO | 2016088048 A1 | 6/2016 |
| WO | 2016110444 A1 | 7/2016 |
| WO | 2016159259 A1 | 10/2016 |
| WO | 2016196382 A1 | 12/2016 |
| WO | 2017006178 A1 | 1/2017 |
| WO | 2017006324 A1 | 1/2017 |
| WO | 2017051202 A1 | 3/2017 |
| WO | 2017081253 A1 | 5/2017 |
| WO | 2017085649 A1 | 5/2017 |
| WO | 2017087663 A1 | 5/2017 |
| WO | 2017108758 A1 | 6/2017 |
| WO | 2017122941 A1 | 7/2017 |
| WO | 2017122942 A1 | 7/2017 |
| WO | 2017122943 A1 | 7/2017 |
| WO | 2017123726 A1 | 7/2017 |
| WO | 2017124085 A1 | 7/2017 |
| WO | 2017126476 A1 | 7/2017 |
| WO | 2017126477 A1 | 7/2017 |
| WO | 2017137851 A2 | 8/2017 |
| WO | 2017142867 A1 | 8/2017 |
| WO | 2017150186 A1 | 9/2017 |

OTHER PUBLICATIONS

A. Endruweit, M. S. Johnson, & A. C. Long, Curing of Composite Components by Ultraviolet Radiation: A Review, Polymer Composites, pp. 119-128 (Apr. 2006).

C. Fragassa, & G. Minak, Standard Characterization for Mechanical Properties of Photopolymer Resins for Rapid Prototyping, 1st Symposium on Multidisciplinary Studies of Design in Mechanical Engineering, Bertinoro, Italy (Jun. 25-28, 2008).

Hyouk Ryeol Choi and Se-gon Roh, In-pipe Robot with Active Steering Capability for Moving Inside of Pipelines, Bioinspiration and Robotics: Walking and Climbing Robots, Sep. 2007, p. 544, I-Tech, Vienna, Austria.

Kenneth C. Kennedy II & Robert P. Kusy, UV-Cured Pultrusion Processing of Glass-Reinforced Polymer Composites, Journal of Vinyl and Additive Technology, vol. 1, Issue 3, pp. 182-186 (Sep. 1995).

M. Martin-Gallego et al., Epoxy-Graphene UV-Cured Nanocomposites, Polymer, vol. 52, Issue 21, pp. 4664-4669 (Sep. 2011).

P. Compston, J. Schiemer, & A. Cvetanovska, Mechanical Properties and Styrene Emission Levels of a UV-Cured Glass-Fibre/Vinylester Composite, Composite Structures, vol. 86, pp. 22-26 (Mar. 2008).

S Kumar & J.-P. Kruth, Composites by Rapid Prototyping Technology, Materials and Design, (Feb. 2009).

S. L. Fan, F. Y. C. Boey, & M. J. M. Abadie, UV Curing of a Liquid Based Bismaleimide-Containing Polymer System, eXPRESS Polymer Letters, vol. 1, No. 6, pp. 397-405 (2007).

T. M. Llewelly-Jones, Bruce W. Drinkwater, and Richard S. Trask; 3D Printed Components With Ultrasonically Arranged Microscale Structure, Smart Materials and Structures, 2016, pp. 1-6, vol. 25, IOP Publishing Ltd., UK.

Vincent J. Lopata et al., Electron-Beam-Curable Epoxy Resins for the Manufacture of High-Performance Composites, Radiation Physics and Chemistry, vol. 56, pp. 405-415 (1999).

Yugang Duan et al., Effects of Compaction and UV Exposure on Performance of Acrylate/Glass-Fiber Composites Cured Layer by Layer, Journal of Applied Polymer Science, vol. 123, Issue 6, pp. 3799-3805 (May 15, 2012).

* cited by examiner

SYSTEM AND METHOD FOR ADDITIVELY MANUFACTURING FUNCTIONAL ELEMENTS INTO EXISTING COMPONENTS

TECHNICAL FIELD

The present disclosure relates generally to an additive manufacturing system and, more particularly, to a system and method for additively manufacturing functional elements into existing components.

BACKGROUND

Traditional additive manufacturing is a process of creating three-dimensional parts by depositing overlapping layers of material under the guided control of a computer. A common form of additive manufacturing is known as fused deposition modeling (FDM). Using FDM, a thermoplastic is passed through and liquified within a heated print head. The print head is moved in a predefined trajectory (a.k.a., a tool path) as the material discharges from the print head, such that the material is laid down in a particular pattern and shape of overlapping 2-dimensional layers. The material, after exiting the print head, cools and hardens into a final form. A strength of the final form is primarily due to properties of the particular thermoplastic supplied to the print head and a 3-dimensional shape formed by the stack of 2-dimensional layers.

A recently developed improvement over traditional FDM manufacturing involves the use of continuous fibers embedded within material discharging from the print head (a.k.a., Continuous Fiber 3D Printing—CF3D™). In particular, a matrix is supplied to the print head and discharged (e.g., extruded and/or pultruded) along with one or more continuous fibers also passing through the same head at the same time. The matrix can be a traditional thermoplastic, a powdered metal, a liquid matrix (e.g., a UV curable and/or two-part resin), or a combination of any of these and other known matrixes. Upon exiting the print head, a cure enhancer (e.g., a UV light, an ultrasonic emitter, a heat source, a catalyst supply, etc.) is activated to initiate and/or complete curing of the matrix. This curing occurs almost immediately, allowing for unsupported structures to be fabricated in free space. And when fibers, particularly continuous fibers, are embedded within the structure, a strength of the structure may be multiplied beyond the matrix-dependent strength. An example of this technology is disclosed in U.S. Pat. No. 9,511,543 that issued to Tyler on Dec. 6, 2016 ("the '543 patent").

It is known to use CF3D™ to embed functional elements into a structure during fabrication. Specifically, one or more of the continuous fibers making up the structure can include wires (electrical leads) and/or optical tubes (e.g., fiber-optic cables). These wires and/or optical tubes can then be used as heaters, strain gauges, and/or signal conductors. Although this technology may provide expanded functionality for newly fabricated structures, the application of this technology to existing structures may be problematic.

The disclosed system and method are directed to overcoming one or more of the problems set forth above and/or other problems of the prior art.

SUMMARY

In one aspect, the present disclosure is directed to a system for additively manufacturing a composite structure. The system may include a head having a matrix reservoir, a nozzle fluidly connected to the matrix reservoir and configured to discharge a composite material into a feature of an existing component. a guide configured to detect a location of the feature, and a cure enhancer configured to expose composite material discharging from the nozzle to a cure energy. The system may also include a support configured to move the head in multiple dimensions, and a controller in communication with the cure enhancer and the support. The controller may be configured to cause the support to move the head during discharge of the composite material into the feature based on the detected location of the feature.

In another aspect, the present disclosure is directed to another system for additively manufacturing a composite structure. This system may include a head having a matrix reservoir, a nozzle fluidly connected to the matrix reservoir and having a plurality of separate channels arranged sequentially in a direction of travel of the head, and a cure enhancer configured to expose composite material discharging from the nozzle to a cure energy. The system may also include a support configured to move the head in multiple dimensions, and a controller in communication with the cure enhancer and the support. The controller may be configured to cause the support to move the head during discharge of the composite material into the feature.

DETAILED DESCRIPTION

Figure 1:
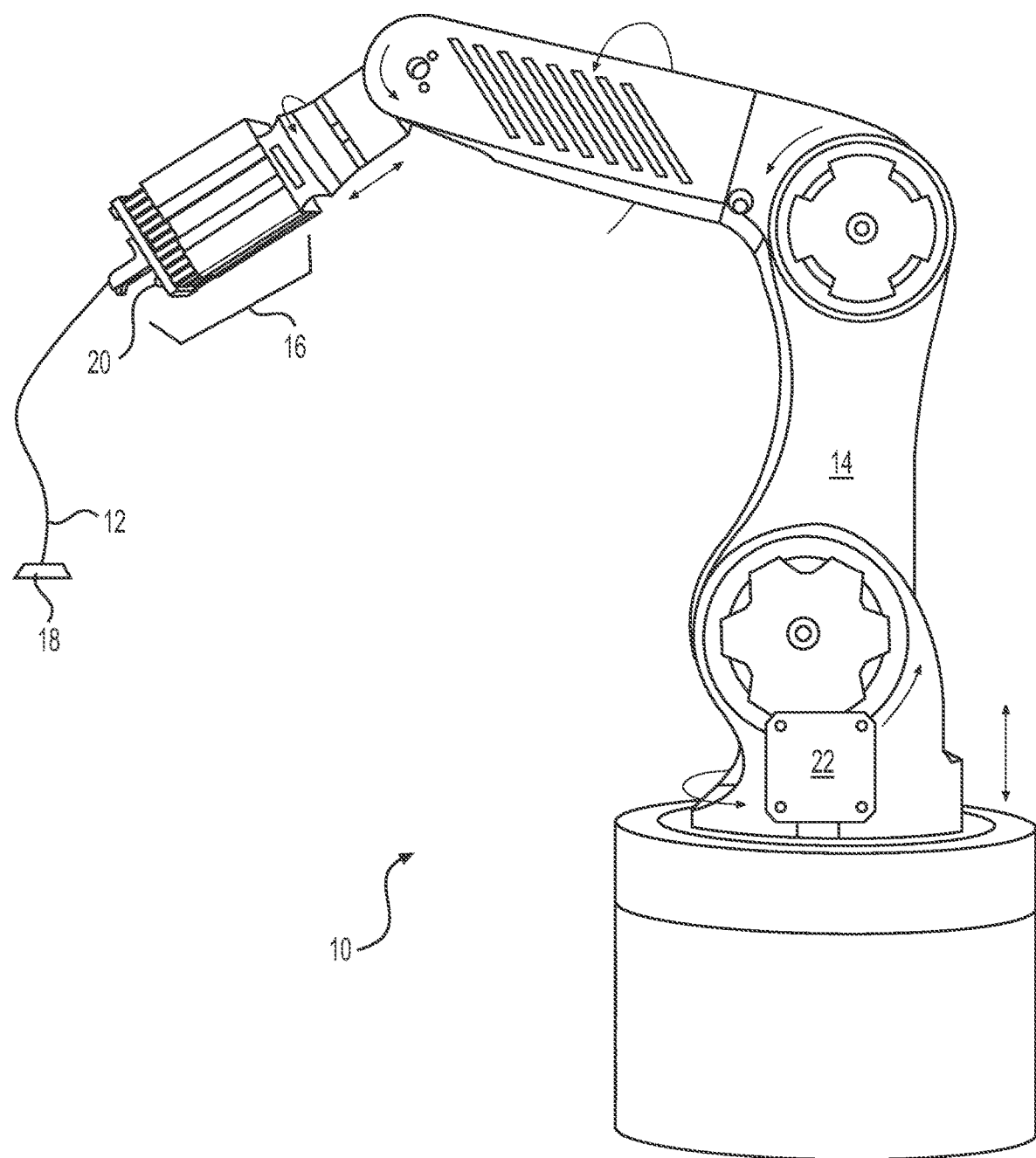
FIG. 1 is a diagrammatic illustration of an exemplary disclosed additive manufacturing system.

FIG. 1 illustrates an exemplary system 10, which may be used to continuously manufacture a composite structure 12 having any desired cross-sectional shape (e.g., circular, polygonal, etc.). System 10 may include at least a support 14 and a head 16. Head 16 may be coupled to and moved by support 14. In the disclosed embodiment of FIG. 1, support 14 is a robotic arm capable of moving head 16 in multiple directions during fabrication of structure 12, such that a resulting longitudinal axis of structure 12 is three-dimensional. It is contemplated, however, that support 14 could alternatively be an overhead gantry or a hybrid gantry/arm also capable of moving head 16 in multiple directions during fabrication of structure 12. Although support 14 is shown as being capable of multi-axis movements, it is contemplated that any other type of support 14 capable of moving head 16 in the same or in a different manner could also be utilized, if desired. In some embodiments, a drive may mechanically couple head 16 to support 14, and may include components that cooperate to move and/or supply power or materials to head 16.

Head 16 may be configured to receive or otherwise contain a matrix. The matrix may include any type of material (e.g., a liquid resin, such as a zero-volatile organic compound resin; a powdered metal; etc.) that is curable. Exemplary matrixes include thermosets, single- or multi-part epoxy resins, polyester resins, cationic epoxies, acrylated epoxies, urethanes, esters, thermoplastics, photopolymers, polyepoxides, thiols, alkenes, thiol-enes, and more. In one embodiment, the matrix inside head 16 may be pressurized, for example by an external device (e.g., an extruder or another type of pump—not shown) that is fluidly connected to head 16 via a corresponding conduit (not shown). In another embodiment, however, the matrix pressure may be generated completely inside of head 16 by a similar type of device. In yet other embodiments, the matrix may be gravity-fed through and/or mixed within head 16. In some instances, the matrix inside head 16 may need to be kept cool and/or dark to inhibit premature curing; while in other instances, the matrix may need to be kept warm for the same reason. In either situation, head 16 may be specially configured (e.g., insulated, chilled, and/or warmed) to provide for these needs.

The matrix may be used to coat, encase, or otherwise at least partially surround any number of continuous reinforcements (e.g., separate fibers, tows, rovings, ribbons, and/or sheets of material) and, together with the reinforcements, make up at least a portion (e.g., a wall, a floor, a ceiling, a filling, etc.) of composite structure 12. The reinforcements may be stored within (e.g., on separate internal spools—not shown) or otherwise passed through head 16 (e.g., fed from external spools). When multiple reinforcements are simultaneously used, the reinforcements may be of the same type and have the same diameter and cross-sectional shape (e.g., circular, square, flat, etc.), or of a different type with different diameters and/or cross-sectional shapes. The reinforcements may include, for example, carbon fibers, vegetable fibers, wood fibers, mineral fibers, glass fibers, metallic wires, optical tubes, etc. It should be noted that the term "reinforcement" is meant to encompass both structural and non-structural types of continuous materials that can be at least partially encased in the matrix discharging from head 16.

The reinforcements may be exposed to (e.g., coated with) the matrix while the reinforcements are inside head 16, while the reinforcements are being passed to head 16 (e.g., as a pre-preg material), and/or while the reinforcements are discharging from head 16, as desired. The matrix, dry reinforcements, and/or reinforcements that are already exposed to the matrix (e.g., wetted reinforcements) may be transported into head 16 in any manner apparent to one skilled in the art.

The matrix alone, the reinforcement alone, and/or the matrix-wetted reinforcement may be discharged from head 16 via at least two different modes of operation. In a first mode of operation, the matrix and/or reinforcement are extruded (e.g., pushed under pressure and/or mechanical force) from head 16, as head 16 is moved by support 14 to create the 3-dimensional shape of structure 12. In a second mode of operation, at least the reinforcement is pulled from head 16, such that a tensile stress is created in the reinforcement during discharge. In this mode of operation, the matrix may cling to the reinforcement and thereby also be pulled from head 16 along with the reinforcement, and/or the matrix may be discharged from head 16 under pressure along with the pulled reinforcement. In the second mode of operation, where the matrix is being pulled from head 16, the resulting tension in the reinforcement may increase a strength of structure 12, while also allowing for a greater length of unsupported material to have a straighter trajectory (i.e., the tension may act against the force of gravity to provide free-standing support for structure 12).

The reinforcement may be pulled from head 16 as a result of head 16 moving away from an anchor point 18. In particular, at a start of structure-formation, a length of matrix and/or matrix-impregnated reinforcement may be adhered to anchor point 18 (e.g., via curing of the matrix). Thereafter, head 16 may be moved away from anchor point 18, and the relative movement may cause the reinforcement to be pulled from head 16. It should be noted that the movement of the matrix and/or reinforcement through head 16 could be assisted (e.g., via internal feed mechanisms), if desired. In some embodiments, the discharge rate of the reinforcement from head 16 may primarily be the result of relative movement between head 16 and anchor point 18, such that tension is created within the reinforcement. It is contemplated that anchor point 18 could be moved away from head 16 instead of or in addition to head 16 being moved away from anchor point 18.

One or more cure enhancers (e.g., one or more light sources, an ultrasonic emitter, a laser, a heater, a catalyst dispenser, a microwave generator, a chiller, etc.) 20 may be mounted proximate (e.g., within, on, and/or trailing from) head 16 and configured to enhance a cure rate and/or quality of the matrix as it is discharged from head 16. In some embodiments, cure enhancer 20 may be controlled to selectively expose internal and/or external surfaces of structure 12 to cure energy (e.g., light energy, electromagnetic radiation, vibrations, heat, a chemical catalyst or hardener, etc.) during the formation of structure 12. In these embodiments, the energy may increase a rate of chemical reaction occurring within the matrix, sinter the material, harden the material, or otherwise cause the material to cure as it discharges from head 16. In other embodiments, cure enhancers 20 may function to remove energy from the matrix, thereby causing the matrix to cool and harden.

A controller 22 may be provided and communicatively coupled with support 14, head 16, and any number and type of cure enhancers 20. Controller 22 may embody a single processor or multiple processors that include a means for controlling an operation of system 10. Controller 22 may include one or more general- or special-purpose processors or microprocessors. Controller 22 may further include or be associated with a memory for storing data such as, for example, design limits, performance characteristics, operational instructions, matrix characteristics, reinforcement characteristics, characteristics of structure 12, and corresponding parameters of each component of system 10. Various other known circuits may be associated with controller 22, including power supply circuitry, signal-conditioning circuitry, solenoid/motor driver circuitry, communication circuitry, and other appropriate circuitry. Moreover, controller 22 may be capable of communicating with other components of system 10 via wired and/or wireless transmission.

One or more maps may be stored in the memory of controller 22 and used during fabrication of structure 12. Each of these maps may include a collection of data in the form of models, lookup tables, graphs, and/or equations. In the disclosed embodiment, the maps are used by controller 22 to determine desired characteristics of cure enhancers 20, the associated matrix, and/or the associated reinforcements at different locations within structure 12. The characteristics may include, among others, a type, quantity, and/or configuration of reinforcement and/or matrix to be discharged at a particular location within structure 12, and/or an amount, intensity, shape, and/or location of desired curing. Controller 22 may then correlate operation of support 14 (e.g., the location and/or orientation of head 16) and/or the discharge of material from head 16 (a type of material, desired performance of the material, cross-linking requirements of the material, a discharge rate, etc.) with the operation of cure enhancers 20, such that structure 12 is produced in a desired manner.

Figure 2:
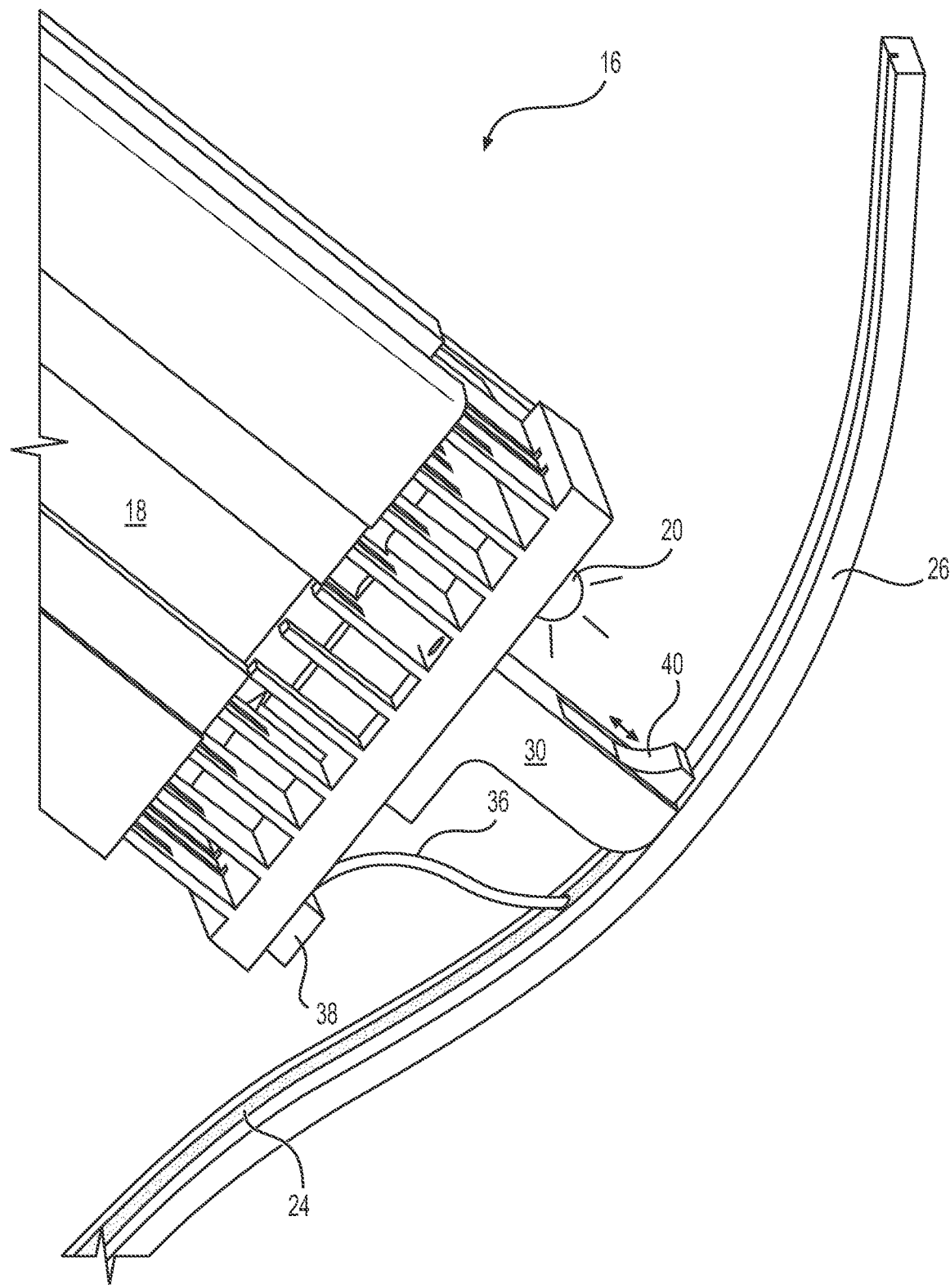
FIGS. 2-5 are diagrammatic illustrations of exemplary disclosed heads that may be used in conjunction with the system of FIG. 1.

As shown in FIG. 2, head 16 may be used to fill a feature (e.g., a groove, a channel, a void, a recess, a crack, etc.) 24 within an existing component 26. Component 26 may include, for example, a body panel (e.g., a wing, a fuselage, a door, a hood, etc.) of a vehicle (not shown), a wall of a residential or commercial building, a pre-fabricated form that functions as a housing for structure 12 (e.g., in a wiring harness application), or another component known in the art. In any of these examples, component 26 may itself function as anchor point 18, for use in fabrication of structure 12 within feature 24. Feature 24 may be formed in advance by way of an integral molding process, an integral additive manufacturing process, a subtractive process (e.g., a milling, grinding, or cutting process), unintentional damage (e.g., as a crack), and/or in other ways. As will be explained in more detail below, the fabrication of structure 12 within feature 24 may completely fill and/or seal feature 24. Alternatively, an additional process may be implemented to top-off and/or seal feature 24 after fabrication of structure 12 inside of feature 24, if desired.

As also shown in FIG. 2, head 16 may include, among other things, a matrix reservoir 28, and one or more nozzles 30 fluidly connected to matrix reservoir 28. In this example, nozzle 30 has a single-path configuration that discharges composite material having a generally circular cross-section. The configuration of head 16, however, may allow nozzle 30 to be swapped out for another nozzle (not shown) that discharges matrix only, reinforcement only, and/or composite material having any desired shape (e.g., a tubular cross-section, a linear or flat cross-section, a box-shaped cross-section, a multi-channel shape, etc.).

Figure 6:
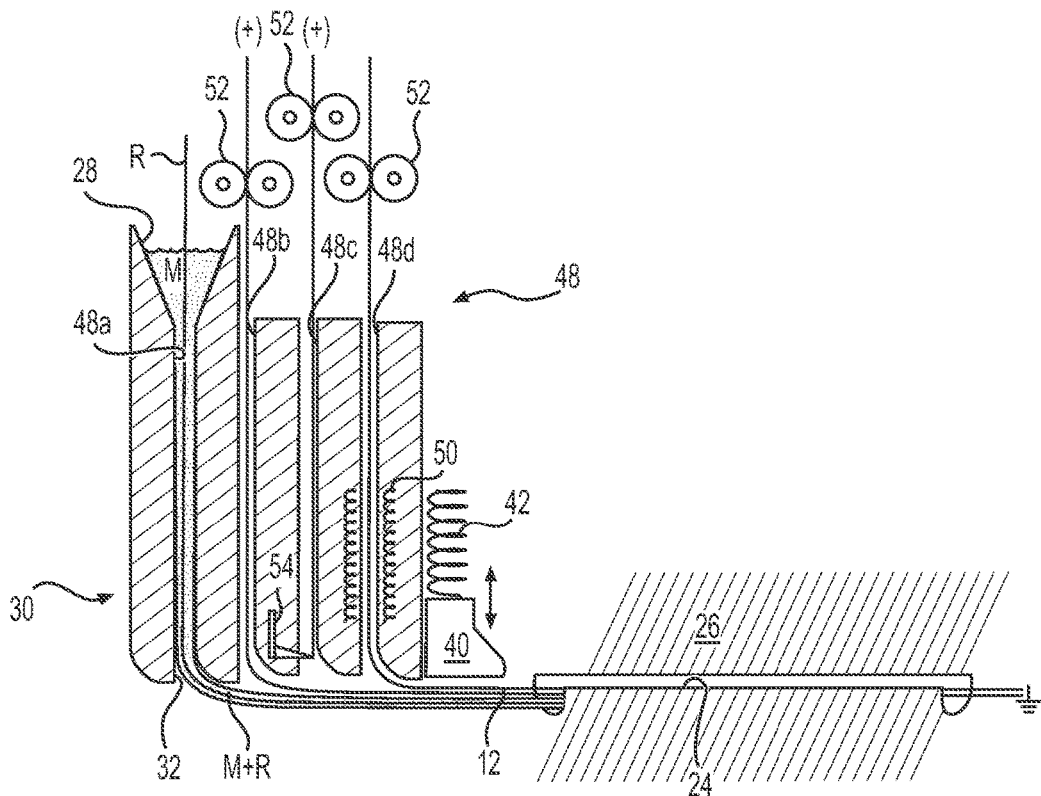
FIGS. 6 and 7 are cross-sectional illustrations of exemplary nozzles that may be used in conjunction with the heads of FIGS. 2-5.

Referring to FIG. 6, an internal volume of matrix reservoir 28 is shown as communicating with nozzle 30 via an opening 32. In the disclosed embodiment, matrix reservoir 28 has a generally circular cross-section, and tapers radially inward to opening 32. A size (e.g., diameter and/or height) of matrix reservoir 28 may be sufficient to hold a supply of matrix material (represented as M in FIG. 2) necessary for wetting any associated reinforcements (represented as R in FIG. 6) passing through nozzle 30.

Referring back to the embodiment of FIG. 2, a size of nozzle 30 (e.g., an outer diameter or width) at a tip end may be designed to accommodate features 24 having a particular width at an outer surface of component 26. For example, nozzle 30 may be sized to be larger than the width of feature 24, such that nozzle 30 may straddle feature 24 and extend radially outward past opposing edges of feature 24. In some applications, the tip end (e.g., opposing sides of a corresponding end surface) of nozzle 30 may contact (e.g., ride along) the upper surface of component 26. In these applications, an axis of nozzle 30 may generally remain normal to an axis of feature 24 during fabrication. As will be described in more detail below, these spatial and orientation relationships may help to pull more matrix (e.g., about 20% more) from nozzle 30 than would otherwise be possible. In some instances, the matrix (together with any associated reinforcement) may fill feature 24 completely. In other instances, a space may be intentionally left at an exposed side of feature 24, such that another material may be deposited adjacent the cured matrix and thereby seal off feature 24. It is also contemplated that, even when the cured matrix completely fills feature 24, the other material could still be deposited adjacent an exposed side of the cured matrix to function as a cap or cover, if desired.

Head 16 may be moved by support 14 to follow a pre-programmed path associated with feature 24, thereby allowing nozzle 30 to fill feature 24 with material. In some applications, it may be beneficial to assist and/or alternatively control movements of head 16 with a detected location of feature 24. A guide 34 may be used for this purpose. It should be noted that, although guide 34 is shown as being connected to head 16, guide 34 could alternatively be located offboard head 16 (e.g., connected directly to support 14 or connected to an independent support—not shown).

In the embodiment of FIG. 2, guide 34 is a mechanical device having a protrusion 36 that extends from a leading side of head 16 into feature 24. Protrusion 36 may be configured to physically engage a portion of feature 24 (e.g., one side wall, both opposing side walls, a bottom, etc.), and an associated sensing mechanism 38 may generate a signal indicative of a real-time trajectory relationship between nozzle 30 and feature 24. The signal may be directed to controller 22, which may responsibly regulate operation of support 14 and movement of head 16 during fabrication of structure 12 to maintain nozzle 30 at a desired location and orientation relative to feature 24.

In some applications, it may be beneficial to compact the material being discharged by nozzle 30. For example, compacting may provide for a greater density of reinforcements, situate the reinforcements at a desired location (e.g., at a center) within the matrix, and/or provide a desired texture to an outer surface of the material. In the depicted example, this compaction is provided by way of a shoe 40 that trails behind nozzle 30 (e.g., between nozzle 30 and cure enhancer 20). It is contemplated, however, that another device (e.g., a compaction wheel) could additionally or alternatively be used for this purpose, if desired.

Shoe 40 may be biased (e.g., via a spring 42—shown only in FIGS. 6 and 7) downward, to slide over the material discharging from nozzle 30 and/or over the upper surface of component 26 at the sides of feature 24. Although shoe 40 is shown as having a generally flat bottom surface that spans at least the full width of feature 24, it is contemplated that shoe 40 could have another shape that produces a non-planar surface and/or that feature 24 could have a narrower width that allows shoe 40 to travel within feature 24, if desired. In some embodiments, shoe 40 may function as a die, imparting a desired shape into the discharging material. A vibration actuator (e.g., a linear resonant actuator—not shown) that generates oscillations of shoe 40 in a direction normal to a trajectory of the discharging material (e.g., in an axial direction of nozzle 30), may be utilized in some applications, to improve compaction, reduce porosity, and/or provide a desired surface texture. In one embodiment, a frequency of the oscillations generated with shoe 40 may be in the ultrasonic range (e.g., at least 20,000 Hz).

Figure 3:
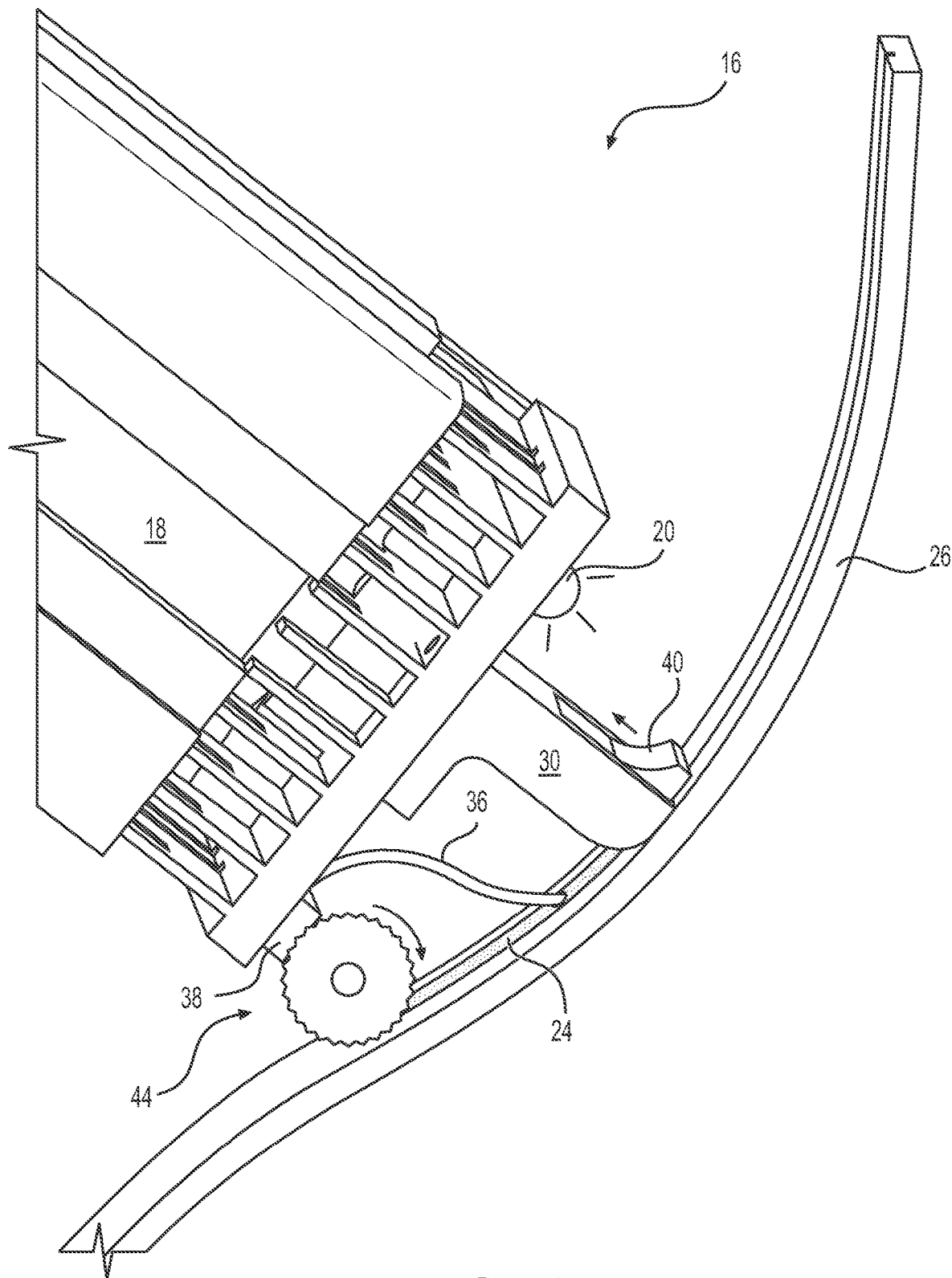

Another exemplary head 16 that may be used to fill feature 24 within component 26 is illustrated in FIG. 3. In this embodiment, feature 24 is not originally an integral part of component 26. In this situation, feature 24 must first be fabricated through a subtraction process, prior to the additive process of filling feature 24 with composite material. In some embodiments, a trajectory of feature 24 may be designed to provide a desired functionality (e.g., to provide even heating of an airfoil, to provide distributed load sensing, etc.) within the existing component 26. In other embodiments, the trajectory of feature 24 may be defined, at least in part, by damage sustained within component 26 (e.g., to cut away damaged material, such that a uniform cross-section and/or depth of feature 24 is achieved along an existing crack trajectory). Head 16 of FIG. 3 may be equipped to execute both the subtractive process and the additive process, during the same or sequential manufacturing passes along the length of component 26. For example, a cutting mechanism 44 may be operatively connected to head 16. In the embodiment shown in FIG. 3, cutting mechanism 44 is a rotary blade. It is contemplated, however, that a router bit, a laser, a torch, or another type of cutting mechanism known in the art could alternatively be employed, if desired. Cutting mechanism 44 may be positioned in front of guide 34, such that guide 34 detects surfaces generated by cutting mechanism 44. Alternatively, guide 34 may be eliminated in some situations, as cutting mechanism 44 may perform functions similar to those performed by guide 34.

Figure 4:
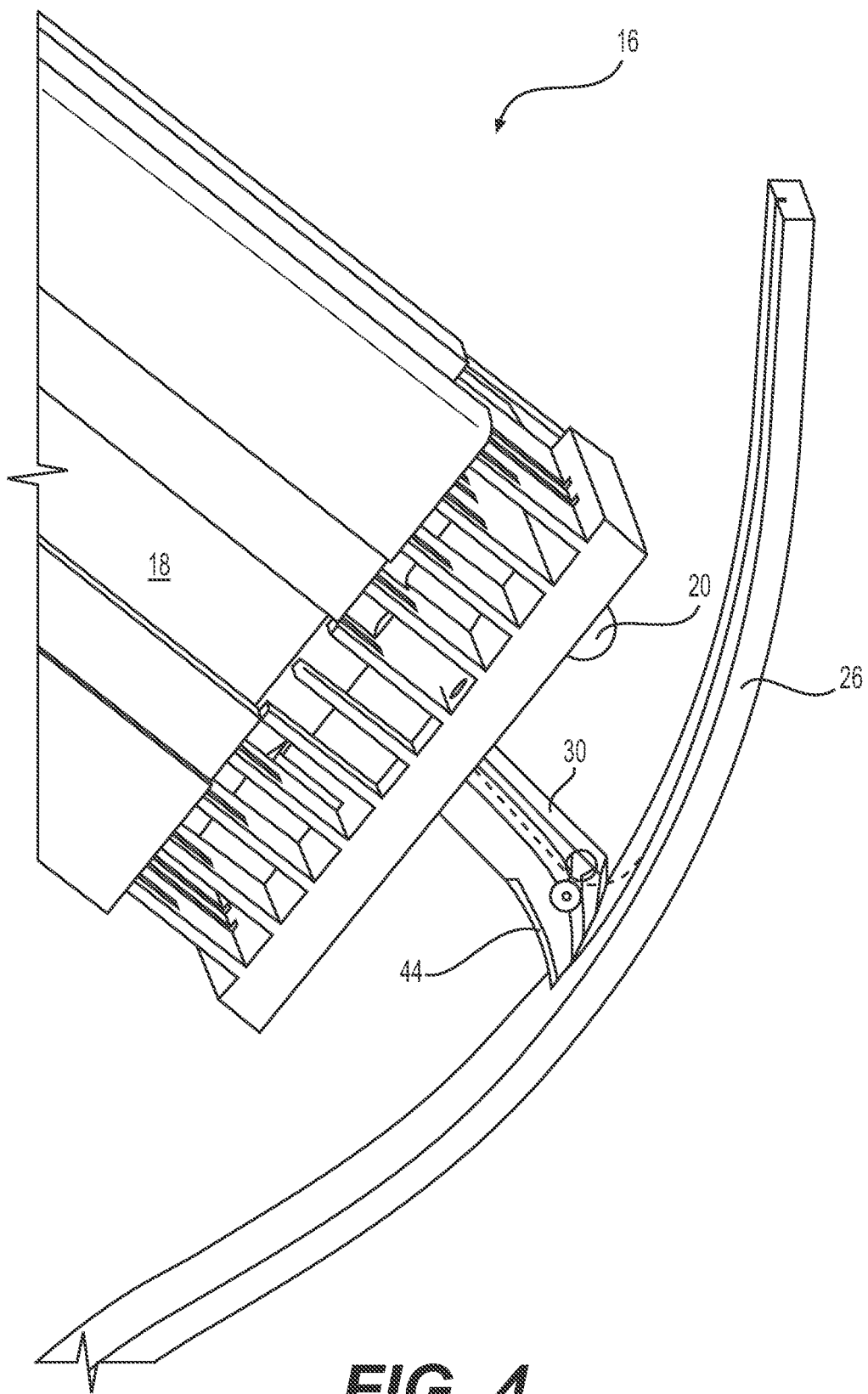

Head 16 of FIG. 4 may also include cutting mechanism 44. However, in contrast to the embodiment of FIG. 3, cutting mechanism 44 of FIG. 4 may be integral with nozzle 30 (e.g., instead of spaced apart in front of nozzle 30). Although any type of cutting mechanism could be integrated into nozzle 30, the example shown in FIG. 4 includes a sharped blade at a leading side of nozzle 30. In some embodiments, the sharpened blade may be heated and/or vibrated to reduce an effort required to cut through the outer surface of component 26. It is contemplated that, instead of removing material from component 26, cutting mechanism 44 of FIG. 4 may simply split the surface of component 26, allowing the material discharging from nozzle 30 to enter the resulting divide while the sharpened blade holds the split open. The two sides of the split may then be released after the composite material has been discharged into the divide, allowing the sides to spring back towards each other. In some applications, no further surface treatment may be required. In other applications, shoe 40 could still be used to smooth over, soften, melt, close-off, or otherwise seal the divide.

Figure 5:
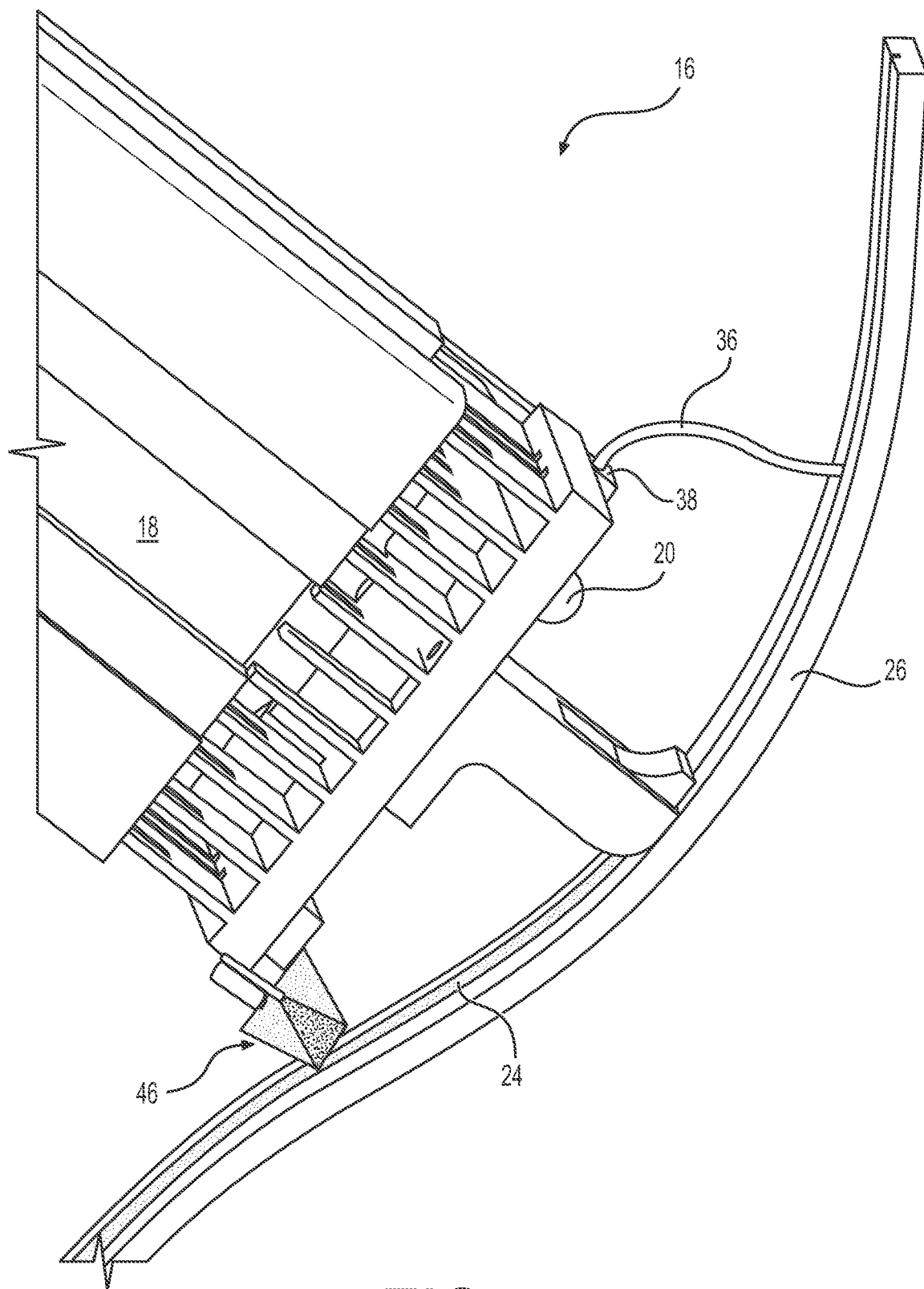

Head 16 of FIG. 5 illustrates a configuration having a no-contact type of guide located at the leading side of nozzle 16. Specifically, head 16 may include a scanner 46 configured to detect a location and/or characteristics (e.g., depth, width, contour, etc.) of feature 24. Scanner 46 may then generate signals directed to controller 22 (referring to FIG. 1), allowing controller 22 to responsively adjust movement and/or operation of head 16. It is contemplated that scanner 46 could be used in conjunction with guide 34, if desired. In this example, guide 34 would be located at a trailing side of nozzle 30, opposite scanner 46. The use of guide 34 together with scanner 46 may allow for more precise positioning control over nozzle 30. It is further contemplated that relative locations of guide 34 and scanner 46 could be swapped. With scanner 46 located at a trailing side of nozzle 30, scanner 46 could function to provide feedback regarding how the material discharging from nozzle 30 is filling feature 24. Controller 22 could then use the signals from scanner 46 to dynamically adjust operation of head 16.

Figure 7:
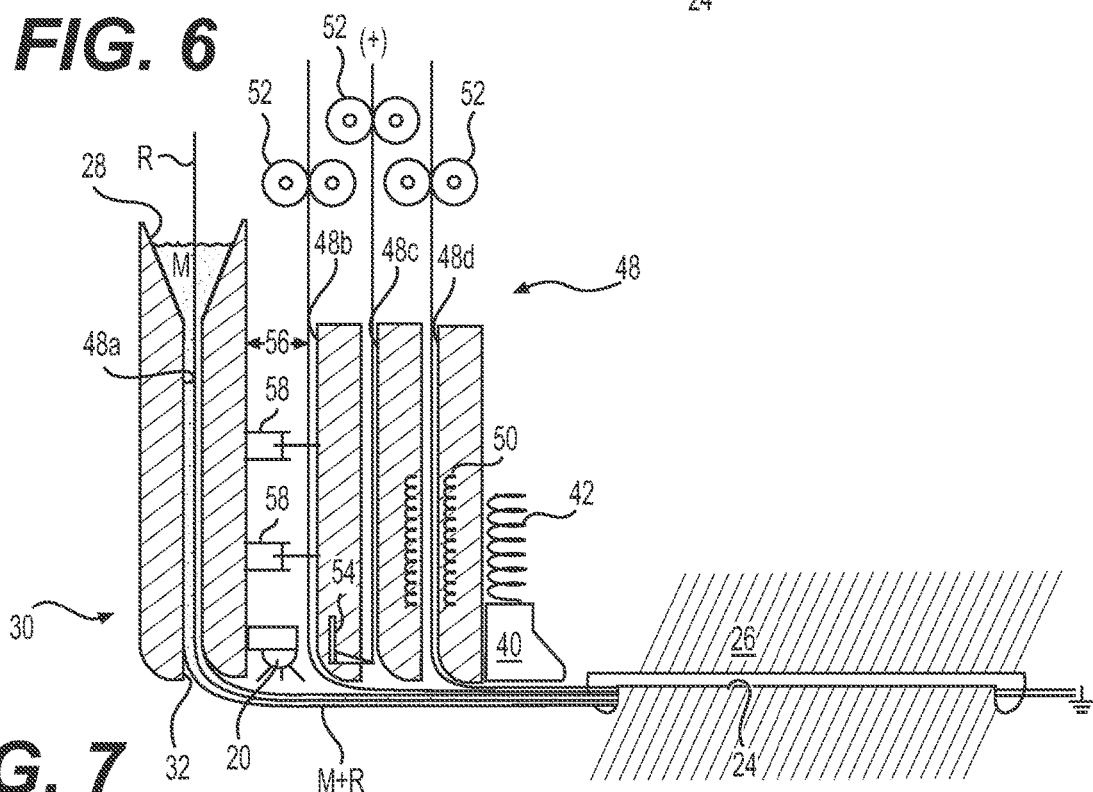

FIGS. 6 and 7 illustrate cross-sections of exemplary nozzle 30 that may be used to fill and/or seal feature 24. As shown in FIG. 6, nozzle 30 may have multiple channels 48 each configured to discharge a distinct track of material (e.g., matrix, reinforcement, wetted-reinforcement, etc.). The tracks of material may be discharged at different times such that only a single track is compacted by shoe 40, or at the same time such that the tracks overlap each other are compressed together into a common layer of structure 12. In the depicted example, four different channels 48 are shown, including a thermoset channel 48a, a first reinforcement channel 48b, a second reinforcement channel 48c, and a thermoplastic channel 48d. Thermoset channel 48a may be located at a leading side of nozzle 30; thermoplastic channel 48d may be located at a trailing side of nozzle 30, and first and second reinforcement channels 48c, 48d may be located sequentially between thermoset and thermoplastic channels 48a, 48d. It should be noted that any number of channels 48 could be included and arranged into any particular configuration.

Thermoset channel 48a may be configured to discharge a reinforcement (e.g., fiberglass) that has been wetted with a thermoset epoxy or the thermoset epoxy alone (e.g., an epoxy contained within matrix reservoir 28). First reinforcement channel 48b may be configured to discharge a matrix-wetted or dry reinforcement of a first size. Second reinforcement channel 48c may be configured to discharge a matrix-wetted or dry reinforcement of a second size. In the disclosed embodiment, first and second reinforcement channels are fluidly isolated from matrix reservoir 28. It is contemplated, however, that one or both of first and second reinforcement channels 48b, 48c could be fluidly connected to matrix reservoir 28, if desired. Thermoplastic channel 48d may be configured to discharge a thermoplastic matrix only or a thermoplastic-wetted reinforcement. Thermoplastic channel 48d may be fluidly isolated from matrix reservoir 28. A trailing edge of each channel 48 may be rounded to reduce breakage of any associated reinforcements.

The thermoset-wetted reinforcement discharging from channel 48a may form a bed within feature 24 for one or both of the reinforcements subsequently discharged from channels 48b and/or 48c. In particular, it has been found that thermoset epoxies may not always readily coat and/or cling to metallic wires and/or optical tubes. However, when placing a wetted-fiber adjacent these other reinforcements, the associated matrix material within the fiber will spread and adequately coat the metallic wires and optical tubes. The thermoplastic material discharging from channel 48d may be substantially identical to the material making up component 26 (or at least formulated to readily bond with the component material in a desirable manner), thereby allowing for sealing of feature 24.

In the embodiment of FIG. 7, curing of the thermoset epoxy may primarily be due to the UV light from cure enhancers 20. Accordingly, the thermoset epoxy may need to be exposed to the UV light prior to the epoxy being covered and sealed by the thermoplastic matrix. For this reason, head 16 of FIG. 7 includes cure enhancer(s) 20 located between thermoset channel 48a and thermoplastic channel 48d (e.g., upstream, between, and/or downstream of first and/or second reinforcement channels 48a and 48b). In some instances, thermoset channel 48a may also need to be insulated from thermoplastic channel 48d, such that the heat associated with thermoplastic channel 48d, such that premature curing does not happen. An air gap 56 may provide at least some of this insulation.

Depending on a distance between thermoset and thermoplastic channels 48a, 48d, it may become difficult for nozzle 30 to accurately lay down material within feature 24. For example, it may be problematic to lay down material into feature 24 when a turn radius of feature 24 is smaller than a distance between channels 48a, 48b. Accordingly, in some embodiments, one or more of channels 48 may be pivotally connected to each other (e.g., via one or more hinges 58). Hinge(s) 58 may allow for a sharper turn radius of nozzle 30. In other embodiments, one or more of channels 48 are features of a monolithic nozzle body.

The heat may be provided via a separate heating mechanism 50 that is associated with thermoplastic channel 48d. For example, heat may be conducted from heating mechanism 50 to a thermoplastic feedstock passing through channel 48, causing the feedstock to soften and/or melt within nozzle 30. Some of this heat may also be conducted toward channel 48a, allowing the associated thermoset epoxy within channel 48a to warm to an initiation threshold just prior to discharge from nozzle 30. In some situations, this heat, alone, may be sufficient to fully cure the thermoset epoxy. In other situations, however, cure enhancers 20 may still be utilized and curing may simply be assisted by the heat from mechanism 50.

It is contemplated that, instead of or in addition to heat being conducted from heating mechanism 50 toward the thermoset epoxy, one or more of the reinforcements within structure 12 could be electrically charged during fabrication of structure 12. For example, a first end (e.g., an end already placed into feature 24) of one or more of the reinforcements could be grounded, while a second end (e.g., an end within a supply located upstream of or inside of head 16) could be charged. A current would then pass from the second end to the first end, causing the reinforcement to heat. The heat from this reinforcement would then be conducted into the surrounding thermoset epoxy, facilitating curing thereof.

Component 26 may benefit from reinforcements of different sizes at different locations within feature 24. Based on component specifications and signals from guide 34 and/or scanner 46 (referring to FIG. 5), controller 22 (referring to FIG. 1) may be configured to selectively cause only the first reinforcement, only the second reinforcement, or both the first and second reinforcements to be advanced out of channels 48a and/or 48b. For example, one or more feed mechanisms (e.g., roller sets, plungers, jets, etc.) 52 may be associated with each channel 48, and configured to advance the associated material through channel 48 in response to a command generated by controller 22. And during transition between reinforcements, controller 22 may selectively cause a cutter (e.g., an ultrasonic blade, a rotary device, a laser, etc.) 54 to sever one or more of the reinforcements. It is contemplated that the same cutter 54 may be used to sever multiple reinforcements (e.g., to pivot between adjacent reinforcements), if desired. After a particular reinforcement has been severed, controller 22 may cause the associated feed mechanism 52 to retract the reinforcement (e.g., a distance back inside of the corresponding channel 48b or 48c).

The reinforcement being discharged through any channel 48 may have unique characteristics that allow for increased functionality within structure 12. For example, the reinforcement may include one or more functional elements 60 connected to or otherwise forming an integral portion of the reinforcement. Functional elements 60 may include, for example, resisters, capacitors, light-emitting diodes (LED), RFID tags, switches, batteries, fuses, filters (e.g., low-pass filters), etc. For example, a particular reinforcement may have, at a particular axial distance along its length, an LED that is integrally joined between opposing first and second ends. At this location, the LED may function as a continuity indicator, for example, illuminating any time a current of a minimum magnitude passes from the first end to the second end. Functional elements 60 may become an integral portion of the reinforcements prior to the reinforcements passing through head 16.

In the disclosed embodiments, the material discharging from channel 48d includes a reinforcement that is braided and/or is made from a metallic foil (e.g., a solid or perforated foil), as well as a thermoset matrix having suspended metallic particles and/or that is electrically conductive and grounded at particular locations. It is also contemplated that the thermoset matrix may be transparent at particular locations, such that the functional elements 60 described above may be observed.

INDUSTRIAL APPLICABILITY

The disclosed system, head, and nozzle may be used to impart functionality to existing structures. For example, wiring harnesses, electrical grids, sensors, heaters, etc. may be embedded into the skins of existing automobiles, aircraft, watercraft, and other types of machine, where light-weight, low-cost, small-footprint, and high-performance are important. These functional elements may be embedded at low-cost, due to the reduction in dedicated tooling for each configuration, and due to the ability to redesign and make on-the-fly adjustments. The associated components embedded into the machines may have a low footprint, because they are fabricated directly in place on machine 12. In addition, the disclosed system may impart high-performance due to the unique ways that particular reinforcements, functional elements 60, and matrix materials can be used and laid out within the components. Operation of system 10 will now be described in detail, with reference to FIGS. 1-7.

At a start of a manufacturing event, information regarding a desired structure 12, feature 24, and/or component 26 may be loaded into system 10 (e.g., into controller 22 that is responsible for regulating operation of support 14, cure enhancer(s) 20, shoe 40, heating mechanism 50, feed mechanisms 52, cutter 54, and/or any other associated components). This information may include, among other things, a size (e.g., diameter, wall thickness, length, etc.), a contour (e.g., a trajectory), surface features (e.g., ridge size, location, thickness, length; flange size, location, thickness, length; etc.), connector geometry (e.g., locations and sizes of couplings, tees, splices, etc.), location-specific matrix stipulations, location-specific reinforcement stipulations, location-specific conductor stipulations, desired cure rates, cure locations, cure shapes, cure amounts, surface contours, etc. It should be noted that this information may alternatively or additionally be loaded into system 10 at different times and/or continuously during the manufacturing event, if desired.

Based on the component information, and one or more different (e.g., different sizes, shapes, and/or types of) reinforcements and/or matrix materials may be selectively installed within system 10 and/or continuously supplied into print head 16. The corresponding reinforcements (e.g., prepreg or dry fibers, tows, ribbons, sheets, wires, optical tubes, etc.) may be threaded through matrix reservoir 28 and/or channels 48 of print head 16 and nozzle 30, and thereafter connected to a pulling machine (not shown) and/or to a mounting fixture (e.g., to anchor point 18 and/or feature 24). Installation of the matrix material may include filling matrix reservoir 28 with resin and/or directing feedstock into channel 48d.

Print head 16 may be moved by support 14 under the regulation of controller 22 to cause matrix only, reinforcement only, and/or matrix-coated reinforcements to be placed against a surface of feature 24 and/or on a corresponding anchor point 18. Cure enhancers 20 may then be selectively activated to cause hardening of the matrix material(s), thereby bonding the reinforcements to anchor point 18 and/or feature 24. In some embodiments, activation of cure enhancers 20 may be unnecessary, and heat from heating mechanism 50 may be sufficient for initial anchoring.

The component, feature, and/or materials information may then be used to control operation of system 10. For example, the reinforcement(s) may be submerged within associated matrixes, and pulled through the corresponding channels 48 to at least partially fill feature 24. As described above, head 16 may additionally fabricate feature 24 prior to filling, in some applications. Controller 22 may selectively cause support 14 to move print head 16 in a desired manner at this time (e.g., based on input and/or feedback from guide 34 and/or scanner 46), such that the discharging composite material follows a desired trajectory inside of feature 24. In addition, cure enhancers 20 may be selectively activated by controller 22 during material discharge to initiate, speed up, or complete hardening of the matrix material. As feature 24 is filled with thermoset matrix, fibers, wires, and/or optical tubes, the exposed side of feature 24 may be sealed off with thermoset matrix (and additional reinforcements, if desired).

As described above, during filling of feature 24, nozzle 30 may be oriented generally normal to the surface of component 26, and ride along sides of feature 24. This may allow matrix located at the tip end of nozzle 30 to contact walls of feature 24. This contact may result in extra (e.g., up to about 20% extra) matrix being drawn out of nozzle 30 than would normally be pulled out by movement of reinforcement only.

Once an end of feature 24 has been reached, the reinforcements may be disconnected (e.g., severed) from print head 16 in any desired manner. In some embodiments, the severed ends of the reinforcement(s) may then be joined to connectors (e.g., power sources, grounds, etc.), if desired, thereby completing fabrication of component 26.

It will be apparent to those skilled in the art that various modifications and variations can be made to the disclosed, system, head, nozzle, and fabrication method. Other embodiments will be apparent to those skilled in the art from consideration of the specification and practice of the disclosed system, head, nozzle, and fabrication method. For example, it is contemplated that a groove cleaner (not shown), similar to cutting mechanism 44, could be used to clean feature 24 (e.g., an existing feature or the feature created by cutting mechanism 44. It is intended that the specification and examples be considered as exemplary only, with a true scope being indicated by the following claims and their equivalents.

What is claimed is:

1. A system for additively manufacturing a composite structure, comprising:
   a head having:
   a nozzle configured to discharge a composite material into a feature of an existing component; and
   a guide configured to detect the feature;
   a support configured to move the head in multiple dimensions; and
   a controller in communication with the support, the controller being configured to cause the support to adjust movement of the head to follow a trajectory of the feature based on the detection of the feature by the guide during discharge of the composite material into the feature,
   wherein:
   the guide is located at a leading side of the nozzle relative to a travel direction of the head; and
   the system further includes a scanner located at a side of the head opposite the guide, the scanner configured to provide feedback to the controller regarding how the composite material discharging from the nozzle is filling the feature.

2. The system of claim 1, wherein the guide physically engages a wall of the feature during movement of the head and discharge of the composite material.

3. The system of claim 1, further including at least one of a shoe and a compaction wheel located at a trailing side of the head.

4. The system of claim 1, further including a cutting mechanism operatively connected the nozzle and configured to form the feature in the existing component simultaneously with the nozzle discharging the composite material into the feature.

5. The system of claim 4, wherein the cutting mechanism is configured to cut away material from the composite structure to form the feature.

6. The system of claim 4, wherein the cutting mechanism is configured to split the composite structure to form the feature.

7. The system of claim 6, wherein the cutting mechanism is an integral portion of the nozzle.

8. The system of claim 1, wherein the nozzle is a multi-channel nozzle.

9. The system of claim 8, wherein the nozzle includes:
   a first channel fluidly connected to the matrix reservoir; and
   a second channel fluidly isolated from the matrix reservoir.

10. The system of claim 9, wherein:
    the first channel is configured to discharge a fiber wetted with a liquid matrix; and
    the second channel is configured to discharge at least one of a wire and an optical fiber into a bed of the fiber-wetted reinforcement.

11. The system of claim 10, further including a third channel located at a side of the second channel opposite the first channel and configured to discharge a thermoplastic matrix over the at least one of the wire and optical fiber.

12. The system of claim 11, further including a heater associated with the third channel.

13. The system of claim 12, wherein an amount of heat from the heater sufficient to initiate a reaction in the liquid matrix is conducted through the nozzle to the first channel.

14. The system of claim 11, further including a fourth channel located between the first and second channels, wherein:
    the second channel is configured to discharge at least one of a wire and an optical fiber having a first size; and
    the fourth channel is configured to discharge at least one of a wire and an optical fiber having a second size.

15. The system of claim 14, further including a cutter operatively connected to the nozzle and located to sever the at least one of the wire and the optical fiber discharging from both of the second and fourth channels.

16. A system for additively manufacturing a composite structure, comprising:
    a head having:
    a matrix reservoir;
    a nozzle fluidly connected to the matrix reservoir and configured to discharge a composite material into a feature of an existing component;
    a guide configured to detect the feature; and
    a cure enhancer configured to expose composite material discharging from the nozzle to a cure energy;
    a support configured to move the head in multiple dimensions; and
    a controller in communication with the cure enhancer and the support, the controller being configured to cause the support to adjust movement of the head to follow a trajectory of the feature based on real-time feedback from the guide during discharge of the composite material into the feature,
    wherein:

the guide physically engages a wall of the feature during movement of the head and discharge of the composite material;
the guide is located at a leading side of the nozzle relative to a travel direction of the head; and
the system further includes a scanner located at a side of the head opposite the guide, the scanner configured to provide feedback to the controller regarding how the composite material discharging from the nozzle is filling the feature.

* * * * *